No. 759,021. PATENTED MAY 3, 1904.
G. W. RUTH.
KNITTING MACHINE.
APPLICATION FILED JUNE 25, 1903.
NO MODEL. 5 SHEETS—SHEET 1.

Witnesses
L. Douville,
C. F. Ingle.

Inventor
George W. Ruth.
By Diedersheim & Fairbanks.
Attorneys

No. 759,021. PATENTED MAY 3, 1904.
G. W. RUTH.
KNITTING MACHINE.
APPLICATION FILED JUNE 25, 1903.
NO MODEL. 5 SHEETS—SHEET 2.
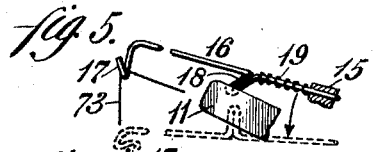
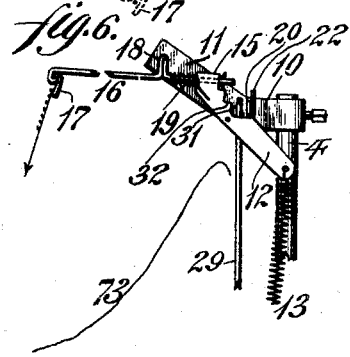
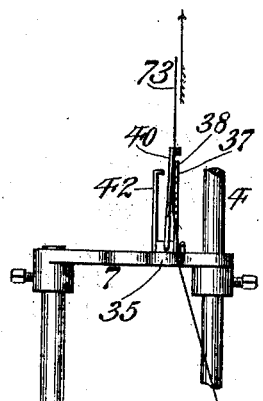
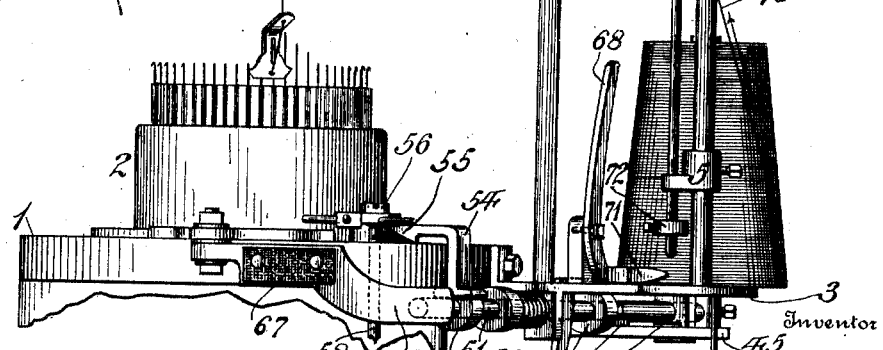

No. 759,021. PATENTED MAY 3, 1904.
G. W. RUTH.
KNITTING MACHINE.
APPLICATION FILED JUNE 25, 1903.
NO MODEL. 5 SHEETS—SHEET 3.

Witnesses
L. Douville,
O. F. Angle.

Inventor
George W. Ruth.
By Wiedersheim & Fairbanks.
Attorneys

No. 759,021. PATENTED MAY 3, 1904.
G. W. RUTH.
KNITTING MACHINE.
APPLICATION FILED JUNE 25, 1903.
NO MODEL. 5 SHEETS—SHEET 4.
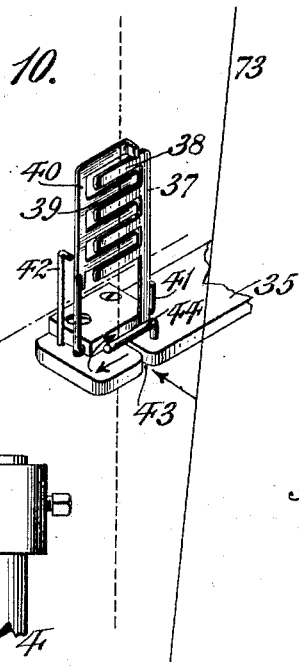
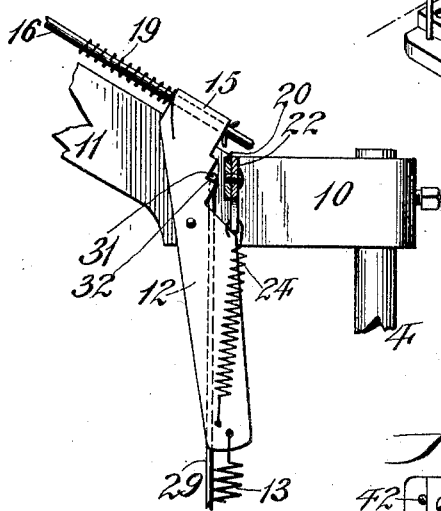
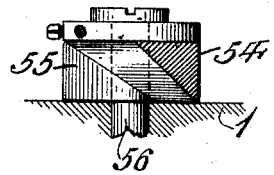
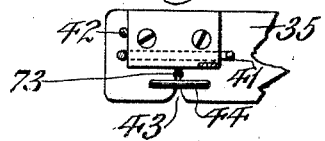
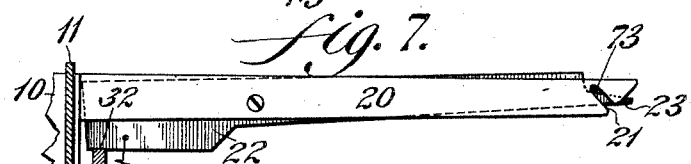
Witnesses
Inventor
George W. Ruth.

No. 759,021. PATENTED MAY 3, 1904.
G. W. RUTH.
KNITTING MACHINE.
APPLICATION FILED JUNE 25, 1903.
NO MODEL. 5 SHEETS—SHEET 5.
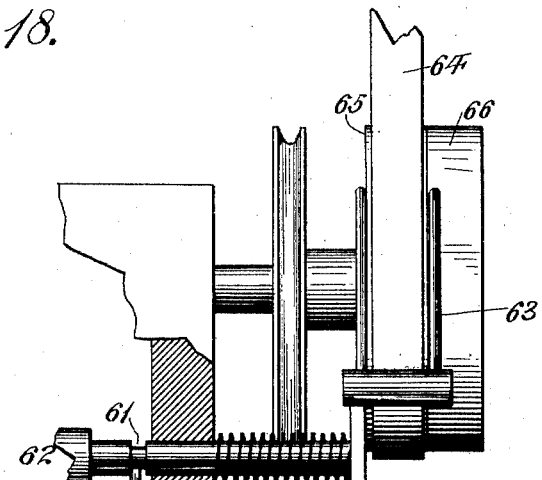
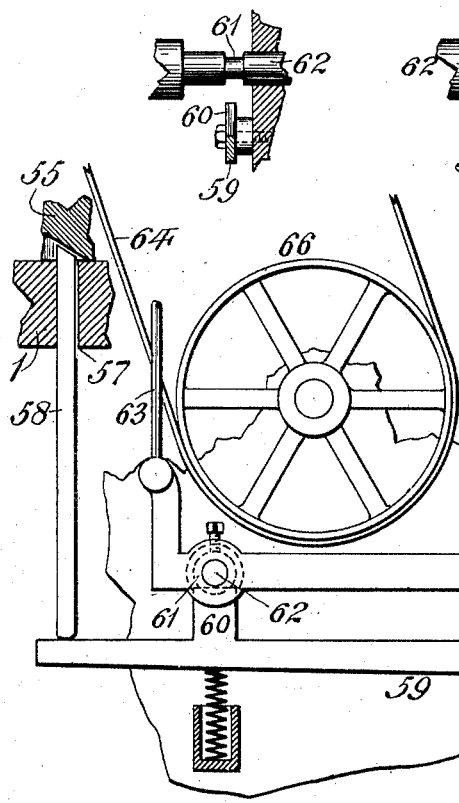
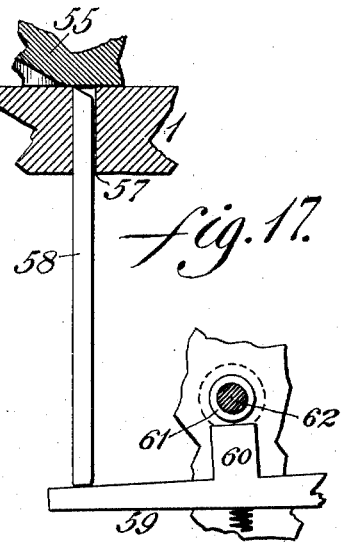

No. 759,021. Patented May 3, 1904.

UNITED STATES PATENT OFFICE.

GEORGE W. RUTH, OF YORK, PENNSYLVANIA, ASSIGNOR TO RUTH AUTOMATIC KNITTING MACHINE COMPANY, A CORPORATION OF DELAWARE.

KNITTING-MACHINE.

SPECIFICATION forming part of Letters Patent No. 759,021, dated May 3, 1904.

Application filed June 25, 1903. Serial No. 163,090. (No model.)

*To all whom it may concern:*

Be it known that I, GEORGE W. RUTH, a citizen of the United States, residing at York, in the county of York and State of Pennsylvania, have invented a new and useful Improvement in Knitting-Machines, of which the following is a specification.

My invention relates to knitting-machines.

It consists of devices for automatically throwing off the power and for applying a brake when the thread breaks or is obstructed.

It further consists of manual means for relieving the brake, returning the shifter, and resetting the automatic devices.

It further consists of means for releasing the yarn, so as to give increased slack when the machine is stopped.

It further consists of devices for facilitating the threading of the machine.

It further consists of other novel features of construction, all as will be hereinafter fully set forth.

Figure 1:
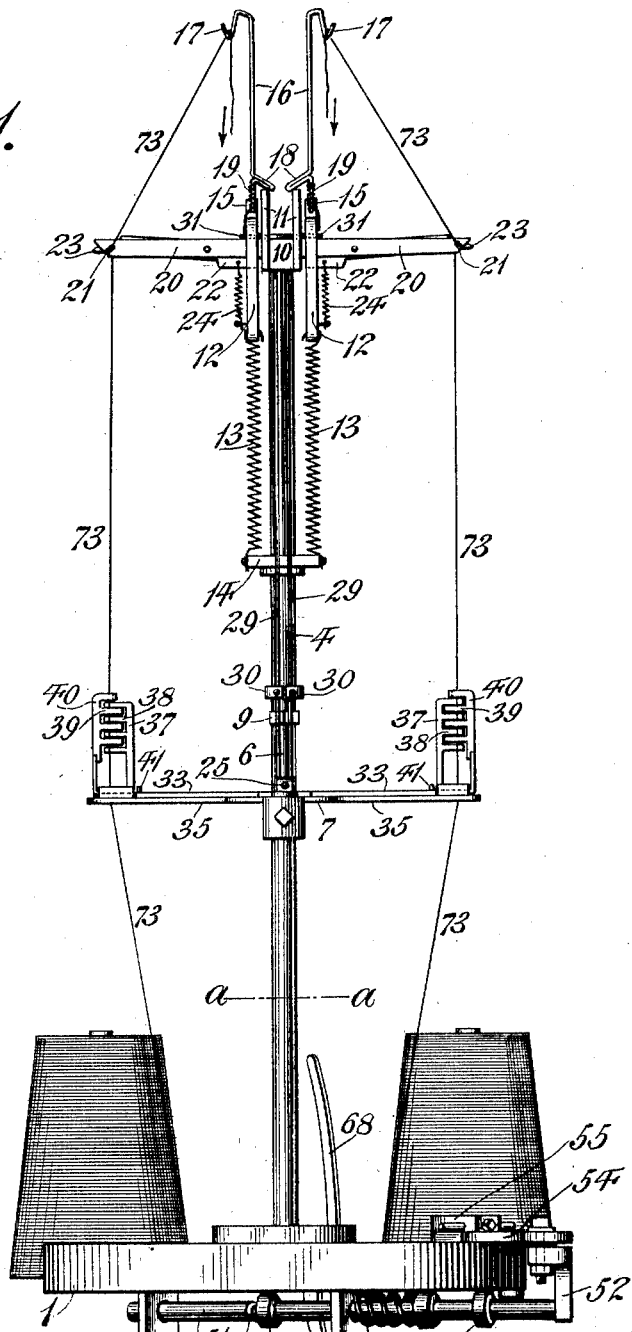
Figure 14:
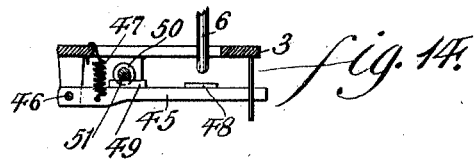
Figure 3:
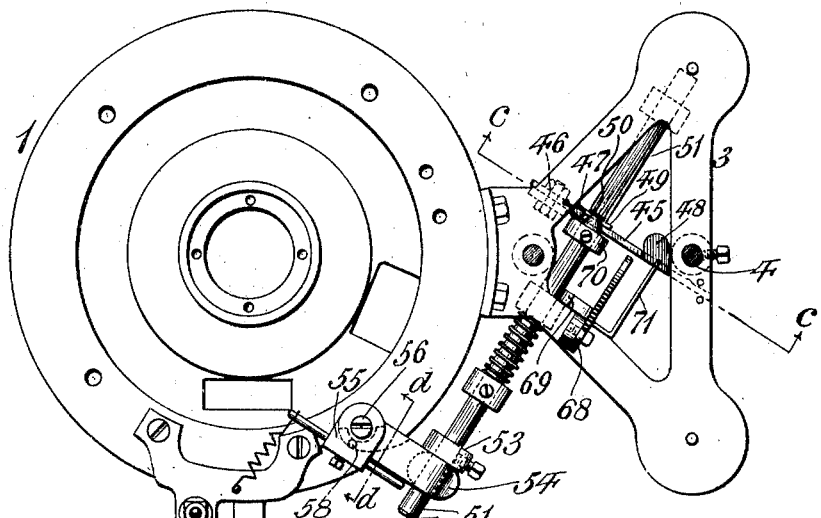
Figure 9:
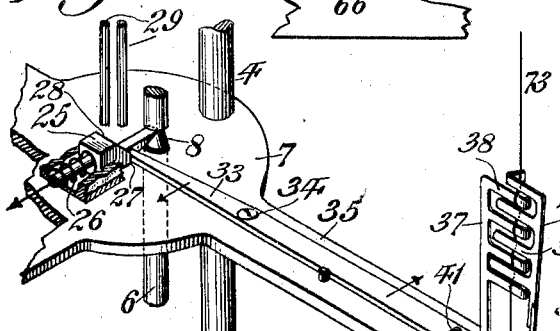
Figure 13:
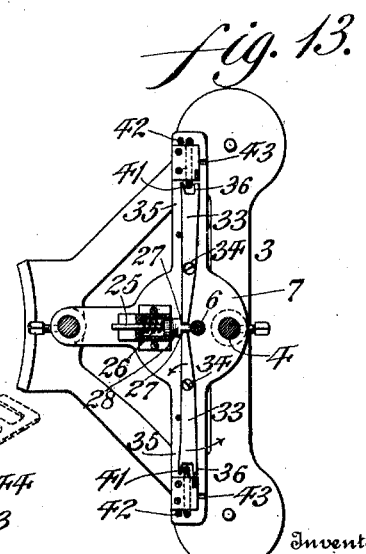

Figures 1 and 2 represent, respectively, front and side elevations of my device, portions being omitted in each figure for the sake of clear illustration. Fig. 3 represents a section through the line *a a*, Fig. 1, the cops being removed. Fig. 4, on a larger scale, and Figs. 5 and 6 represent partial elevations of a yard-guide arm and adjacent parts. Figs. 7 and 8, enlarged, represent a lateral yarn-guide in different position. Figs. 9, 10, and 11, enlarged, and Fig. 12 represent a portion of the yarn-comb and connected parts. Fig. 13 represents a plan through the line *b b*, Fig. 2. Fig. 14 represents a section through the line *c c*, Fig. 3. Fig. 15 represents a section through the line *d d*, Fig. 3, enlarged. Figs. 16 to 19, enlarged, represent parts of the belt-shifting mechanism.

Similar numerals of reference indicate corresponding parts in the figures.

Referring to the drawings, 1 designates a base-plate in which is rotatably mounted the cam-cylinder 2. From a bracket 3 at the rear of the plate rises a rod 4, carrying a guide 5, through which passes the foot of a drop-rod 6. The upper end of the rod 6 passes through a plate 7, is provided with a notch 8, and carries near its upper end a head or nut 9. At the upper end of the rod 4 is a bracket 10, having a pair of forwardly and upwardly extending lugs 11. Pivoted to the sides of the bracket 10 are plates 12, the lower ends of which are connected by springs 13 to an adjustable collar 14 on the rod 4. In a bearing 15 in each of the plates 12 a yarn-guide arm 16 is free to rotate. The arm 16 causes at its free end a yarn-guide hook 17 and has near its inner end a lug 18, held in engagement with the lug 11 by means of a spring 19. Projecting laterally from the bracket 10 are wings 20, at the free ends of which are downwardly and outwardly opening notches 21. Pivoted on each of the wings 20 is a plate 22, the outer end of which has a tongue 23. A spring 24 connects each of the plates 22 and 12 and serves to hold the tongue 23 adjacent the notch 21, with which it coacts to form an eye. On the plate 7 is supported a bolt 25, actuated by a spring 26 and engageable with the notch 8 in the drop-rod 6. The bolt 25 has lateral shoulders 27 and a cam-surface 28. Engageable with the latter are two vertical movable rods 29, carrying vertically-adjustable collars 30, the feet of the rods passing through a guide in the plate 7. The upper ends of the rods 29 are guided in the bracket 10 and provided with lateral pins 31, engaging teeth 32 in the plates 12. Engaging the shoulders 27 of the bolt 25 are levers 33, pivoted at 34 in lateral arms 35 of the plate 7 and having a jaw 36 at their free ends. At the extremity of each arm 35 is a stationary comb 37, having teeth 38, intermeshing with which are the teeth 39 of the pivoted comb 40, the lug 41 of which engages with the jaw 36. A stop 42 (shown in Fig. 12) limits the movement of the comb 40. A slot 43 in the arm 35 has projecting across it a pin 44.

Supported beneath the bracket 3 is a lever 45, pivoted at 46, normally upheld by a spring 47 and having a strike-plate 48 in the path of the rod 6. A dog 49 on the lever 45 engages a notch 50 in a spring-actuated bolt 51, the free end of which is in the path of a brake-lever 52, a collar 53 on the bolt being in the path of a spring-actuated lever 54, secured to a cam 55, contacting with the plate 1. Adjacent the vertical pivot 56 of the lever 54 and cam 55 is an aperture 57 in the plate 1, through which passes a rod 58, extending downward to contact with a spring-supported lever 59. On the lever 59 is a dog 60, engaging in a notch 61 in a spring-actuated shifting rod 62, which carries a fork 63, embracing a belt 64 on the tight and loose pulleys 65 66. On the lever 52 is a brake-shoe 67, adapted to contact with the side of the pulley 65.

A hand-lever 68, pivoted to the bracket 3, has a foot 69, adapted to contact with a collar 70 on the bolt 51, and an arm 71, contacting with a collar 72 near the foot of the rod 6.

The operation is as follows: Presuming that the machine is running and threaded, as is shown in Figs. 1 and 2, it is evident that either what is called a "tight bobbin" or of a knot or like obstruction in the yarn 73, catching in the slot 43 or the notch 21, will draw down the yarn-guide arm 16. This through the action of the lug 18 on the lug 11 will rotate the arm and release the yarn from the hook 17, as shown in Fig. 6. At the same time the plate 12 will tilt the heel of the plate 22 and take the tongue 23 out of relation to the notch 21 in the wing 20, again releasing the yarn 73, as shown in Figs. 7 and 8. In this way all the slack yarn from the comb 37 may be knitted up without breaking. In the meantime the tooth 32 of the plate 12 has released the pin 31 and permitted the rod 29 to percussively engage the cam 28 of the bolt 25, thus releasing the drop-rod 6. This falls upon the strike-plate 48, (vide Figs. 3 and 14,) depresses the detent-lever 45, and disengages the dog 49 from the notch 50 in the bolt 51. The collar 53 on the bolt, acting through the lever 54, turns the cam 55 to depress the rod 58. (Vide Figs. 12 and 15.) This in turn depresses the lever 49 and unlocks the dog 60 from the notch 61 of the shifting rod 62, whereby the belt 64 is thrown onto the loose pulley 66. (Vide Figs 17 to 19, inclusive.) The brake-lever 58 has already been forced by the bolt 51 against the side of the tight pulley 65, (vide Fig. 3,) so that the machine stops very quickly and before the slack yarn has been exhausted. If a yarn breaks, it is evident that the lug 41 of the comb portion 40 will through the lever 38 (vide Fig. 13) force back the bolt 25 and, as before, shift the belt and quickly brake the machine. In rethreading the machine the yarn is first slipped into the notch 43 (vide Figs. 10 and 11) and behind the pin 44. The pin acts to hold the yarn in the notch while operator is raising the pivoted comb 40 and engaging the yarn therewith. This while apparently a small matter is, in fact, a means of saving a great deal of vexation and loss of time in threading a knitter. After the machine is rethreaded the operator through the foot 69 of the hand-lever 68 throws back the bolt 51, thereby releasing the brake-shoe 67 from the pulley 65 and permitting the spring on the shaft 61 to return the belt 64 to the tight pulley 65. The same movement of the lever 68, by means of the contact of the arm 71 with the collar 72 on the drop-rod 6, raises the rod, so that the bolt 25 engages in its notch 8. The head 9, acting through the collars 30, lifts the rods 29, so that their pins 31 engage the teeth 32 in the plate 12. The machine will then continue to run until a new obstruction or break again simultaneously releases the yarn-slacking, belt-shifting, and braking devices.

When in the claims I designate the belt-shifting, brake, and other portions of my device as "spring-actuated," it is evident that I purpose to include the well-known mechanical equivalent of a moving weight.

It will be evident that various changes may be made by those skilled in the art which will come within the scope of my invention, and I do not, therefore, desire to be limited in every instance to the exact construction herein shown and described.

Having thus described my invention, what I claim as new, and desire to secure by Letters Patent, is—

1. In a stop-motion, a belt-shifter, a brake, a bolt adapted to render operative said shifter and said brake, a detent-lever normally engaged with said bolt, a drop-rod adapted to strike said detent-lever and a hand-lever having a foot engageable to return said bolt and an arm adapted to lift said rod.

2. In a knitting-machine a yarn-guide arm axially rotatable in a pivoted support.

3. In a knitting-machine, a yarn-guide arm axially rotatable in a pivoted support and means for partially rotating said arm as it is turned on such pivot.

4. In a knitting-machine, a pivotally-mounted yarn-guide-arm support, a yarn-guide arm rotatable in said support independently of its pivotal movement, yarn-supporting means on said arm and means operative by increased tension on the yarn for disengaging it from said supporting means.

5. In a knitting-machine, a yarn-guide arm axially rotatable in a pivoted support, a yarn-engaging hook at the free end of said arm and means for disengaging the yarn from said hook when said arm is turned on such pivot.

6. In a knitting-machine, a pivotally-mounted yarn-guide-arm support, a yarn-guide arm rotatable in said support independently of its pivotal movement, a yarn-engaging hook at the free end of said arm and means for rotating said arm when it is turned on its pivot whereby the yarn is disengaged from said hook.

7. In a knitting-machine, a pivoted plate, a yarn-guide arm rotatably supported in said plate and a lug on said arm coacting with a part of said machine to rotate said arm when said plate is turned on its pivot.

8. In a knitting-machine, a yarn-supporting portion in two parts, one of which has a notch and the other a tongue coacting with said notch to form a yarn-engaging eye, one of said parts being pivotally supported and means independent of said yarn-engaging eye for moving said pivotally-supported part under an increased tension of the yarn whereby said portions are separated and the yarn disengaged therefrom.

9. A knitting-machine having a yarn-guide arm axially rotatable in a pivoted support and a two-part yarn-supporting portion both operative to disengage the yarn under increased tension thereon.

GEORGE W. RUTH.

Witnesses:
JOHN A. WIEDERSHEIM,
C. D. McVAY.